Figure 1:
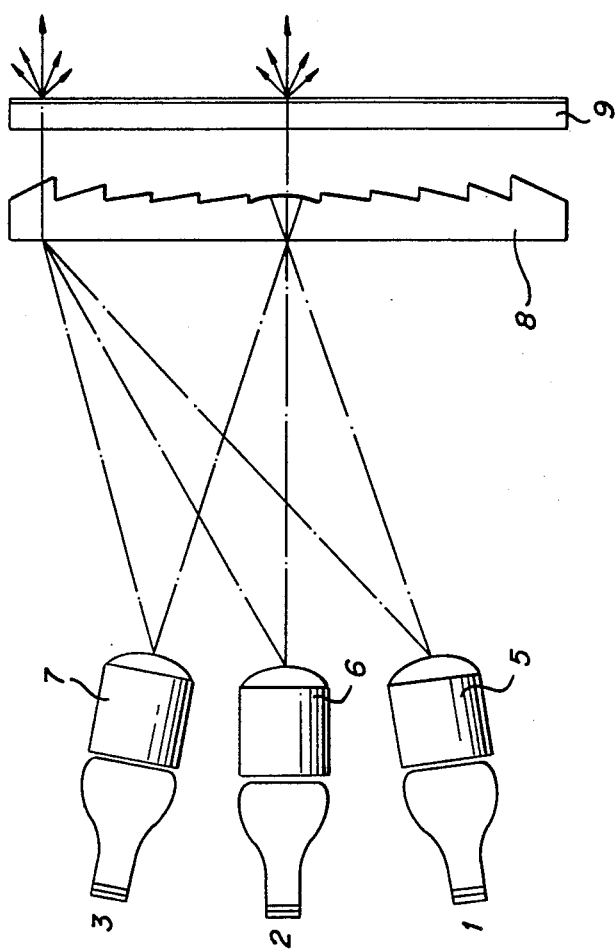

United States Patent [19]

Clausen et al.

[11] Patent Number: 4,923,280
[45] Date of Patent: May 8, 1990

[54] REAR-PROJECTION SCREEN

[75] Inventors: Johannes Clausen, Charlottenlund; Erik Clausen, Gentofte, both of Denmark

[73] Assignee: Dai Nippon Printing Co., Ltd., Tokyo, Japan

[21] Appl. No.: 349,680

[22] Filed: May 10, 1989

[30] Foreign Application Priority Data

Dec. 9, 1988 [DK] Denmark .............................. 6872/88

[51] Int. Cl.$^5$ ............................................. G03B 21/60
[52] U.S. Cl. .................................................... 350/128
[58] Field of Search ................................. 350/126–129

[56] References Cited

U.S. PATENT DOCUMENTS

| | | | |
|---|---|---|---|
| 2,618,198 | 11/1952 | Luboshez | 350/128 |
| 2,738,706 | 3/1956 | Thompson, Jr. | 350/127 |
| 3,279,314 | 10/1966 | Miller | 350/126 |
| 4,418,986 | 12/1983 | Yata et al. | 350/129 X |
| 4,432,010 | 2/1984 | Oguino | 358/60 |
| 4,468,092 | 8/1984 | Inoue et al. | 350/128 |
| 4,469,402 | 9/1984 | Yata et al. | 350/128 |
| 4,509,822 | 4/1985 | Clausen et al. | 350/128 |
| 4,509,823 | 4/1985 | Moriguchi et al. | 350/128 |
| 4,561,720 | 12/1985 | Clausen et al. | 350/129 X |

FOREIGN PATENT DOCUMENTS

| | | |
|---|---|---|
| 134627 | 8/1983 | Japan . |
| 108232 | 5/1987 | Japan . |
| 139539 | 6/1987 | Japan . |
| 85725 | 4/1988 | Japan . |
| 85727 | 4/1988 | Japan . |

Primary Examiner—Richard A. Wintercorn
Attorney, Agent, or Firm—Larson and Taylor

[57] ABSTRACT

A transparent rear-projection screen, e.g. for video projection, consisting of three screen elements, of which the rearmost element, which faces the light sources, is a Fresnel lens, and the middle element on its reverse or entrance side is provided with lens profiles for horizontal diffusion of the light, and on its front or exit side are lenses for parallelling the light from various light sources, and in which screen the foremost, visually enhanced screen element has on its reverse or entrance side horizontal, convex, rectilinear lenses, the focal point of which is congruent to the tops of projections provided on the front or exit side of the foremost screen element, and from the surface of which the light is emitted.

20 Claims, 8 Drawing Sheets

REAR-PROJECTION SCREEN

The present invention relates to a rear-projection screen consisting of three screen elements, of which the rearmost element, facing the projectors, serves to parallel the light emitted from the projectors, the middle element serves to diffuse the light horizontally as well as to parallel the light from the three light sources, and the foremost element, being the visually enhanced element, on its reverse side in the position of use of the screen is provided with horizontal, rectilinear, parallel, convex lenses, the focal distance of which is equal to the thickness of the screen element, and which on its front side is provided with rectilinear, horizontal projections, on the tops of which the light can emit, and in which between the tops of the projections grooves exist, which are covered with light impenetrable material, e.g. black paint, to increase the contrast.

Rear-projection screens have to a great extent been used for video projectors, microfilm readers, data processing machines and aircraft simulators.

From the specifications to U.S. Pat. No. 4,432,010 and U.S. Pat. No. 4,509,823 rear-projection screens are known, which in the position of use of the screen on the front side and the reverse side are provided with horizontal, convex lenses, where between the convex lenses on the front side projections are provided, which are covered with black paint to increase the contrast in the screen, see FIG. 3. The front side lens of the screen serves to parallel the light from the three light sources in such a manner that irrespective of the visual angle the observer will see a chromatically pure picture.

A considerable drawback to the above screen construction is the low contrast, as for technical reasons only 40 to 50 percent of the surface may be covered with light impenetrable material. This means that light from the observer's side may penetrate into the screen and be reflected to the observer, see FIG. 5.

From the specifications to U.S. Pat. No. 3,279,314 and U.S. Pat. No. 2,738,706 rear-projection screens with lens tops on the front side, i.e. the side facing the observer, are known. A common feature of these patents is that the individual lens tops on the inside totally reflect the light parallelled by the projectors and that after this total reflection the light streams out of the top of the lens. When observing a cross-section of the top of the lens it will be seen that the individual lenses mutually form a V-shaped groove. From the above patents it is known to fill these grooves with black paint or some other medium containing light impenetrable material for the purpose of increasing the contrast.

The most substantial distinction between the above patents and the present invention is that in the above patent, the reverse side of the screen, i.e. the side facing the projector, is completely plane and thus does not contain any lens structure for deflection of the light. Another substantial difference is that the inventions described in the above U.S. patents relate to conical lens tops, whereas in the position of use the present invention on the reverse side of the foremost screen element has horizontal, rectilinear, convex lenses, the focal point of which is congruent with the front plane of the screen, where the light is emitted from the tops of the projections.

Furthermore, from U.S. Pat. No. 2,618,198 a screen is known, which consists of two screen elements, in which each screen element is provided with groups of parallel cylindrical lenses facing the projectors, and in which in addition each screen element is provided with cylindrical lenses placed at right angles to each other. The element facing the projectors is on its reverse side provided with vertical, rectilinear, convex lenses, the focal point of which is congruent with the front side plane of the screen. In order to achieve a good contrast effect black covering stripes as broad as possible are applied to the front side of the screen. The space between the covering stripes is to be used for emission of the light, which is seen by the observer and which forms the picture in question. The front side element is completely identical with the reverse side element. However, the convex, rectilinear lenses are horizontal, when the screen is in its position of use.

In spite of the fact that in connection with the above screen a so-called Fresnel lense for parallelling the light from the projectors is used, the screen construction will only be applicable, when "one" projector is used, as the rays of light from several projectors will not be parallel to the normal of the Fresnel lense in question, but will leave the Fresnel lense at an angle corresponding to the angle mutually formed by the optical axes of the individual projectors.

The consequence of this feature is that the rays of light, which do not penetrate into the visually enhanced front element of the rearmost screen element as normal to the surface, will after deflection by the convex lenses be displaced at an angle corresponding to the angle of the optical axis of the projector in question to the normal to the surface and thus be lost in the black covering stripes.

In addition, another different feature of the prior invention is that the surface for the emitted light does not contain any lens structure.

It is the object of the present invention to combine the good qualities of the middle screen element to diffuse the light horizontally as well as to parallel the rays of light from the three light sources with the good qualities of the foremost element to prevent room light from penetrating into the screen.

It is known to produce a television picture by directing three projectors with individual ground colours (red, green and blue) towards a transparent projection screen. Normally, the three projectors are placed horizontally side by side, and the enlarged picture emitted is directed towards the transparent screen. Due to the fact that the three projectors are placed side by side, their optical axes form angles with each other. Normally, the optical axes form anlges with each other from 7° to 12° depending on the size of the picture tube and the distance between the picture tube and the transmission screen.

Most constructors of projection television place the green picture tube between the red and the blue picture tubes in such a manner that the optical axis of the green picture is projected perpendicularly to the transmitting screen. This implies that the optical axes of the blue and the red picture tubes deivate by e.g. 9° in relation to the optical axis of the green picture tube.

Figure 3:
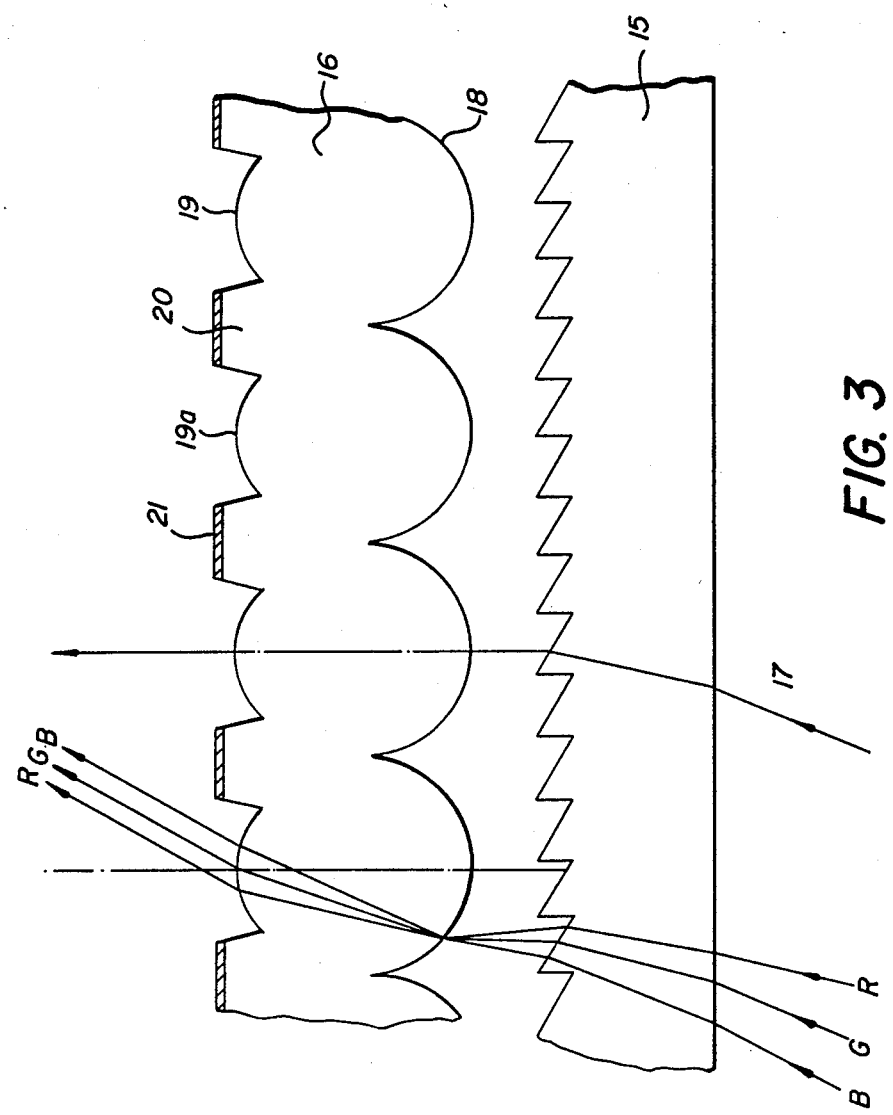

It is known to produce a television rear light projection screen as shown in FIG. 3, which in the position of use is placed with the parallel, convex lenses 18 and 19 in the vertical direction, and in which 15 refers to a Fresnel lense for parallelling the light, 16 refers to the visually enchanced screen element with the lens 18, the focal point of which merges with the surface of the lens 19, and in which between the convex lenses 19,19a projections 20 with projection tops 21 are placed for application of the covering stripes to increase the contrast.

As the lens 18 serves only to diffuse the light horizontally, glass powder or $SiO_2$ is added to the screen of the known construction shown in FIGS. 3, 4, 5 and 6 for diffusing the light in the vertical direction.

Figure 4:
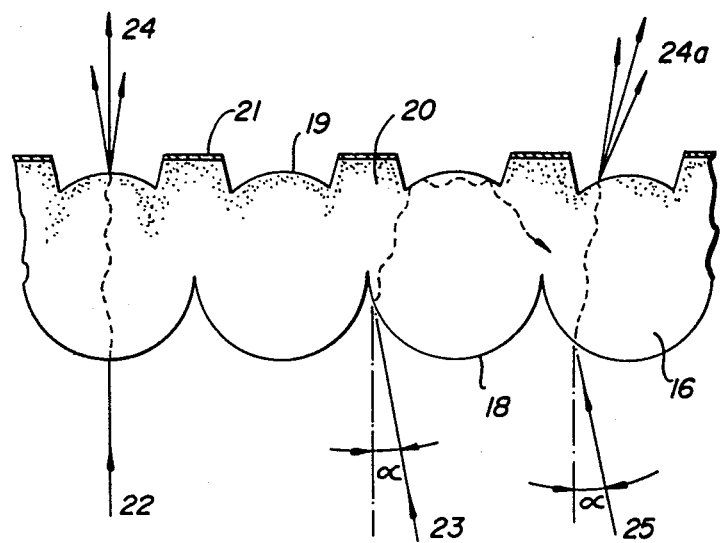

Refractive particles are often spread over the entire thickness of the screen element with the effect that not all rays will hit the lens 19 in a well-defined focal point, see FIG. 4, but will be deflected in undesirable directions with the result of reduced picture quality. The refractive particles are not shown in FIGS. 5 and 6, but are illustrated in FIG. 4 by the rays of light 22, 23 and 25 winding through the screen, and furthermore, the diffusion of the light is illustrated by the vector crowds 24 and 24a. Besides, it is seen that the ray of light 23 emitted from the red or the blue light source is lost due to internal reflection, as the angle of incidence $\alpha$ is 7° to 10° wider than the optical axis of the green light source.

Figure 5:
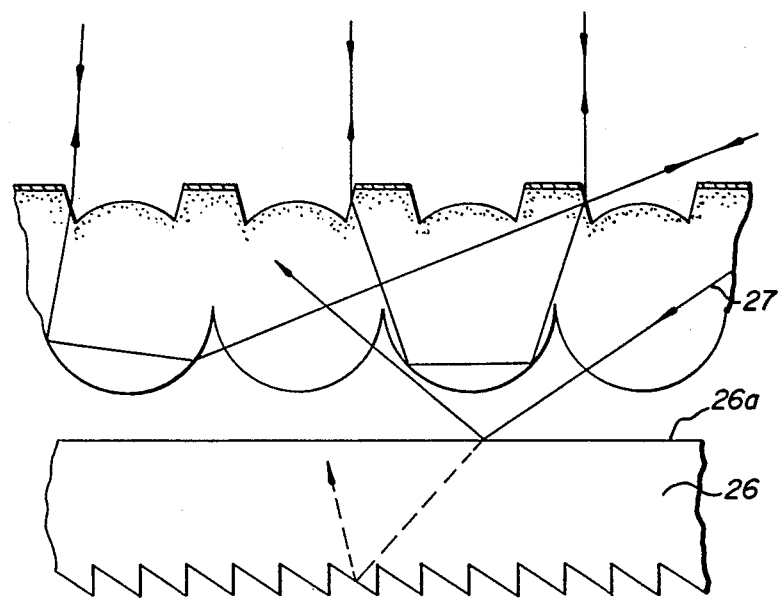
Figure 6:
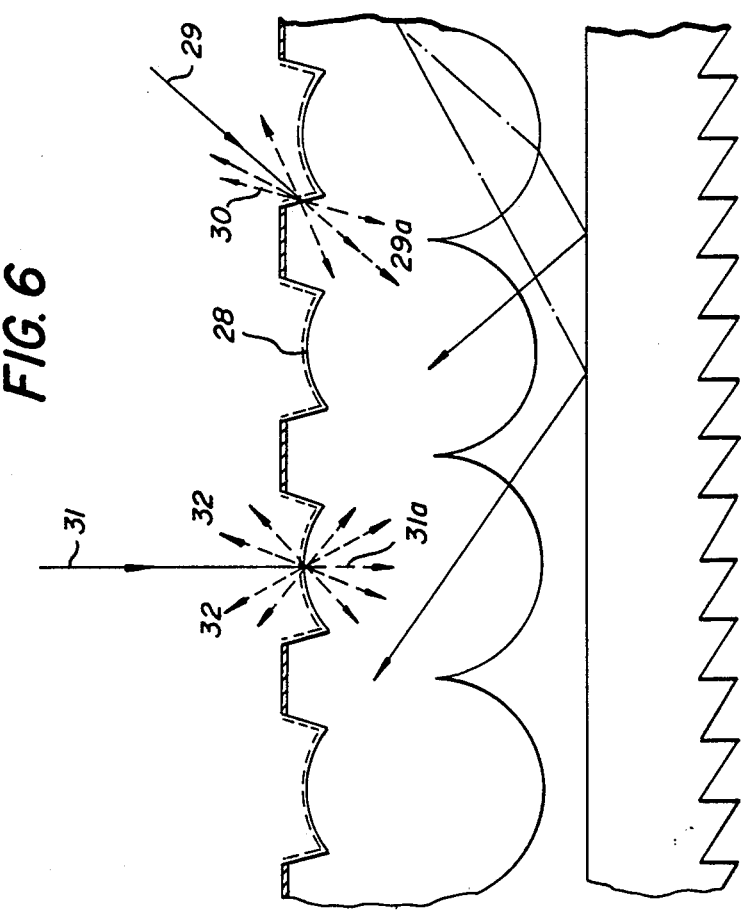

FIGS. 5 and 6 show the path of rays for room light penetrating into the screen and being reflected to the observer. For the sake of clearness, the concentric grooves of the Fresnel lens 26 in FIG. 5 are facing the projectors. It is seen that the ray of light 27 is totally reflected on the surface 26a of the Fresnel lens 26. Among people skilled in the art it is known to frost the front side 28, see FIG. 6. Said frosting shall prevent inconvenient reflection from the surroundings. The irregular surface, which diffuses the light, reduces the contrast considerably, as can be seen from the vector crowds 29a,30 and 31a, 32. The explanation to this reduction of contrast is that an irregular surface will always have an angle in relation to the surface of the screen in such a manner that no matter where in the room the ray of light comes from, it will penetrate the surface 28.

Among people skilled in the art it is known that the visually enhanced ability of a rear-projection screen is reduced, when it is used in a highly illuminated room. In addition it is known that diffusion of the light in the screen of the light projected onto the screen occurs outside the desired illuminated area, as the light can move from the illuminated groove to the neighboring grooves, see FIGS. 4, 5 and 6. The same applies to light falling into the screen from the front of the screen, of which some light is lost inside the screen, while some light is diffused to the neighboring grooves or is reflected from the Fresnel lens, as illustrated in FIGS. 5 and 6, and subsequently is reflected to the observer.

Both situations have an inconvenient effect on the formation of pictures, including especially the blurring of the shades.

The constructors of projection television aim at reducing the dimensions of the television sets with the effect that the angle $\alpha$ between the axes of the three light sources becomes larger, which makes it necessary to use a lens construction as shown in FIG. 3 for parallelling the light from the three light sources B(lue), G(reen) and R(ed), as an observer watching the television set from the front would otherwise observe a grouping of the colours in the screen in such a manner that one half of the screen would be dominated by red light and the other half would be dominated by blue light.

By the invention the properties of the middle screen element with regard to diffusing the light from the three light sources horizontally are combined with the properties of the foremost screen element with regard to preventing room light from penetrating into the screen.

By the invention a considerable improvement of contrast is achieved by providing the reverse side of the foremost screen element 10 (FIG. 2) with linear, horizontal, rectilinear convex lenses 11, the object of which is to collect the arriving rays of light and direct them towards the horizontal projections 12 on the front side, on the tops 13 of which the light comes out, and between which V-shaped grooves 14 are provided, the sides of which are covered with a light impenetrable medium.

The rear-projection screen according to the present invention is characterized by being a transmitting lens screen without internal reflecting surfaces in the screen, and in which each individual lens element on the visually enhanced side cannot reflect light to the neighboring lens, as the individual visually enhanced lenses are separated by V-shaped grooves 14.

Figure 2:
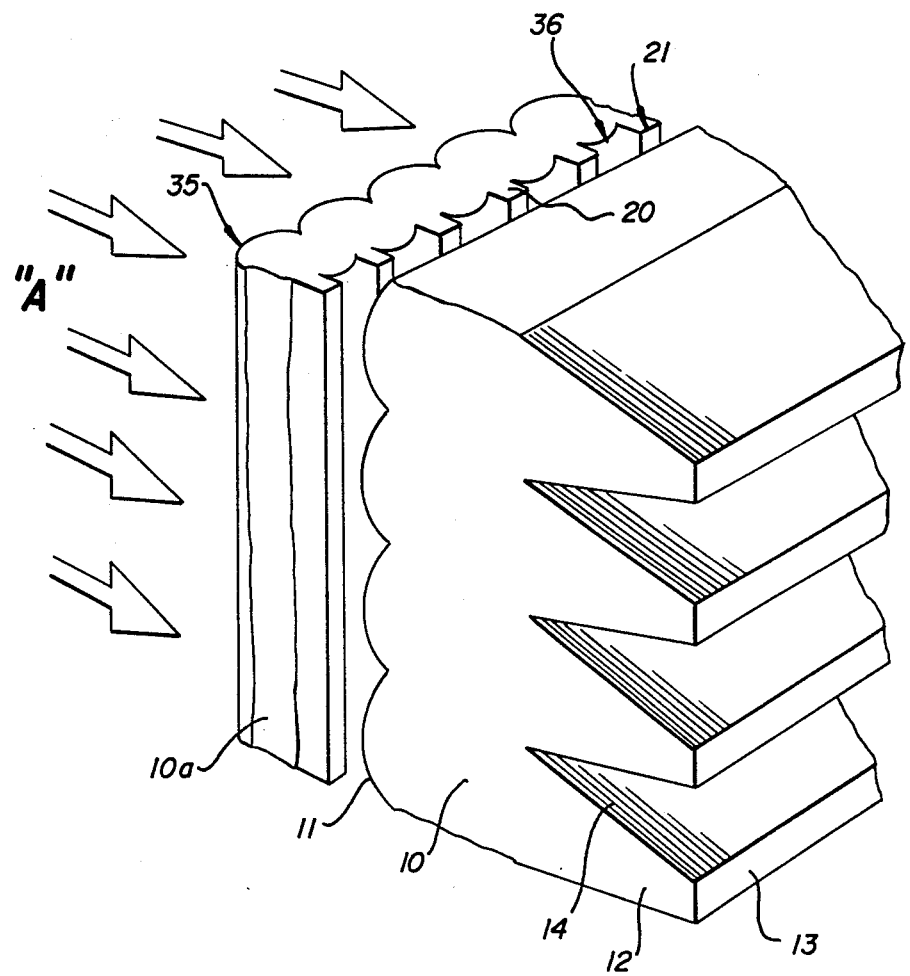
Figure 7:
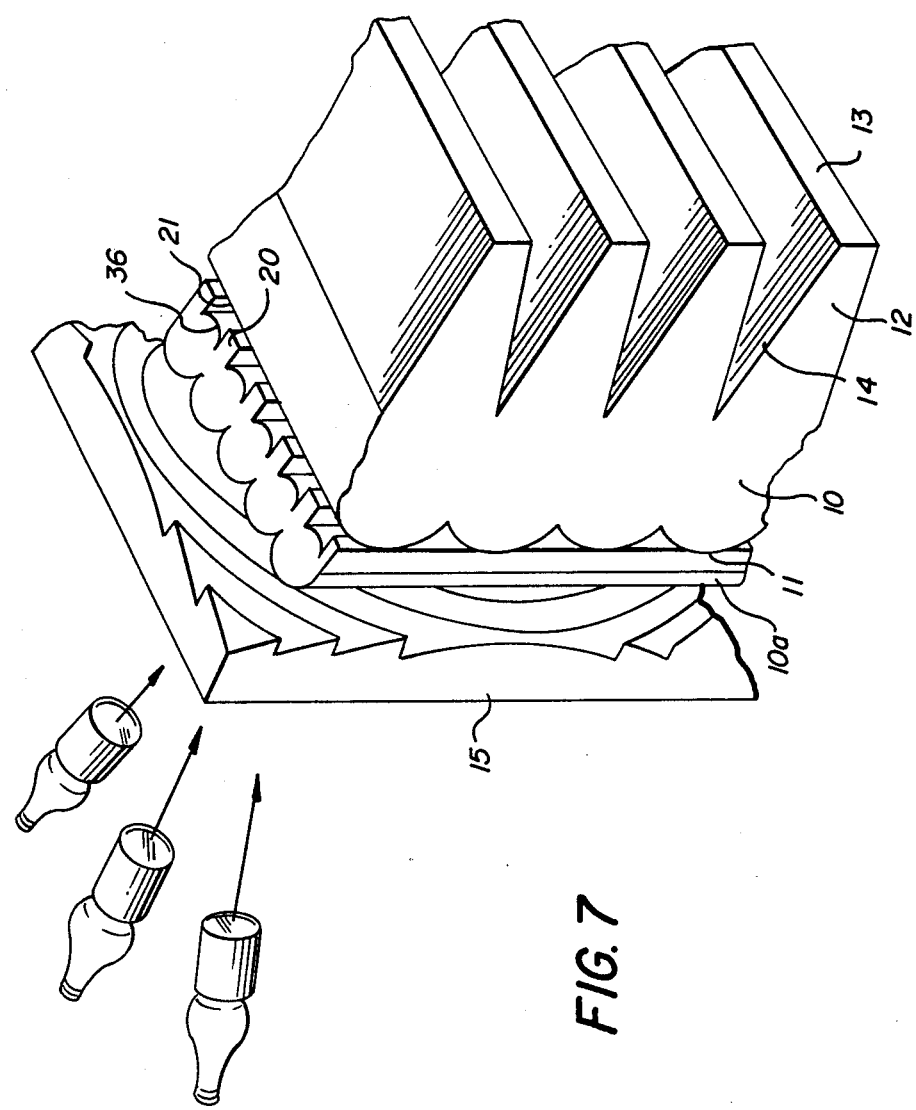
Figure 8:
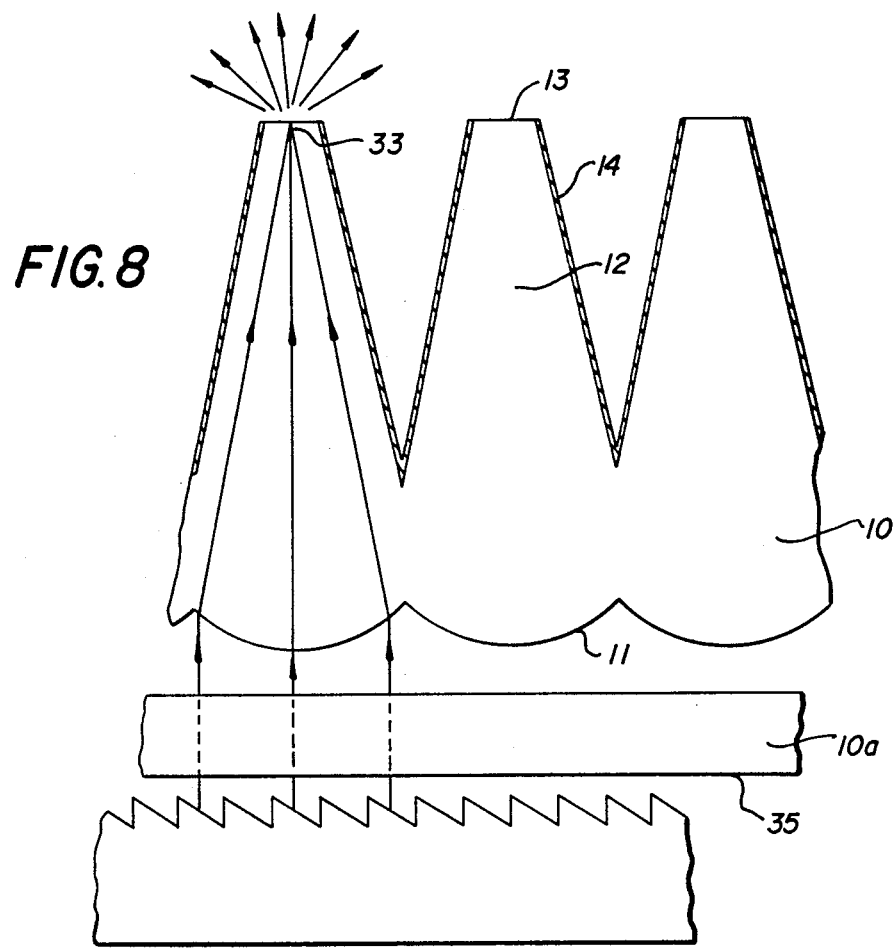
Figure 9:
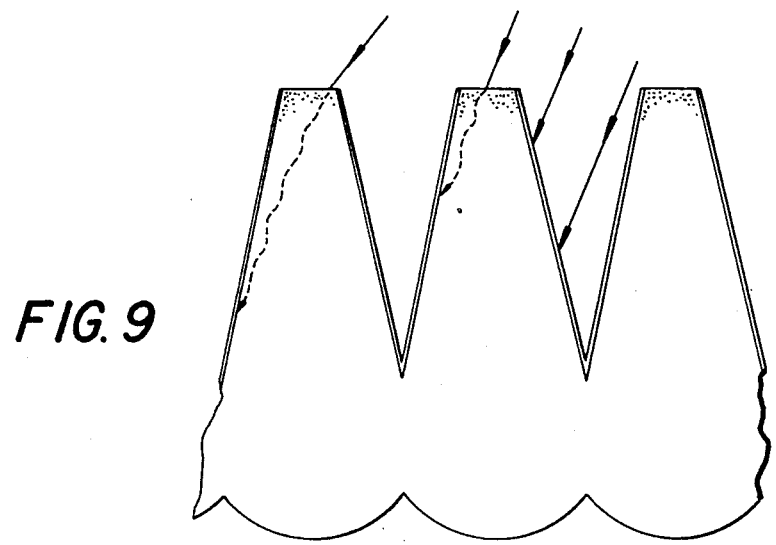
Figure 10:
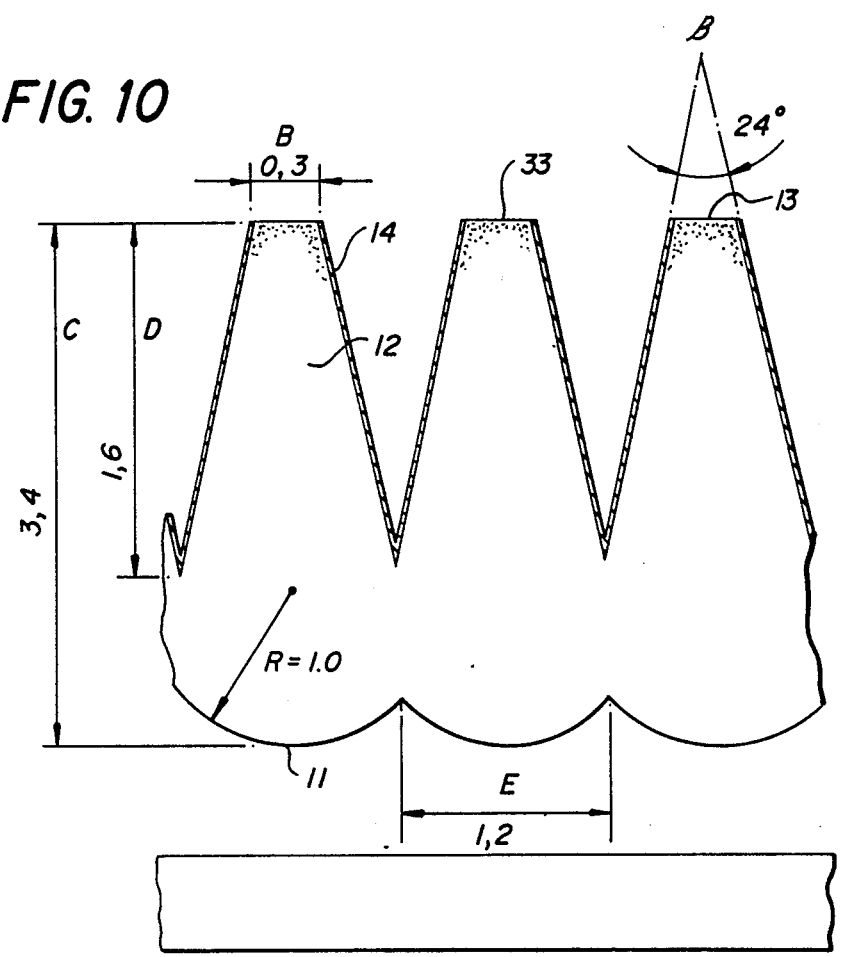
Figure 11:
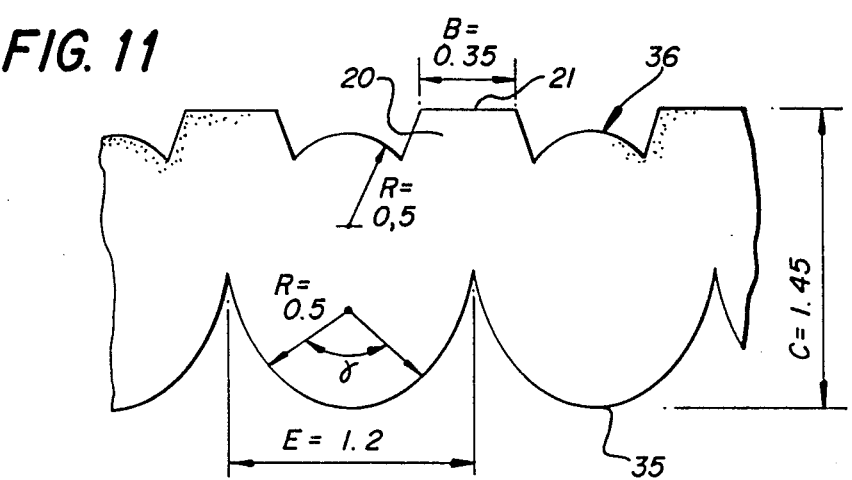

The invention will be described in more detail below with reference to the drawing, in which FIG. 1 shows a colour projection television system, which consists of a projection screen with two screen elements to illustrate the use of projection screens of the kind referred to (Prior Art), FIG. 2 shows in perspective a section of an embodiment of the screen according to the invention, FIG. 3 shows a cross-section of a known screen construction, FIG. 4 shows internal reflections by the screen element 16 shown in FIG. 3, FIG. 5 shows reflections of room light by the screen shown in FIG. 3, FIG. 6 shows reflections as well as diffusion of the light in the frosted surface of the front side by the screen according to FIG. 3, FIG. 7 shows in perspective a section of an embodiment of of the screen according to the invention, FIG. 8 shows a section through the drawing shown in FIG. 2 according to the present invention to illustrate the path of rays, FIG. 9 diagrammatically shows that rays of daylight are absorbed in the front side of the screen according to the present invention, and FIGS. 10 and 11 show drawings corresponding to FIG. 2 to illustrate various amended embodiments of the screen according to the invention.

FIG. 1 shows how the three projectors 1, 2 and 3 project television pictures towards the reverse side of a projection screen 8 and 9. Each projector emits green, red and blue light, respectively. The three projectors are placed horizontally side by side in such a manner that the optical axis of the projector 2, which is usually the green projector, is perpendicular to the screen 8 and 9.

The optical axes of the projectors 1 and 3 often form an angle of 8° to 12° in relation to the projector 2.

By means of the three projectors 1, 2 and 3 the lenses 5, 6 and 7 mounted in front thereof it is possible to form a picture, which is enlarged in relation to the projectors, on the screen consisting of the screen elements 8 and 9.

FIG. 2 shows in perspective an embodiment of the screen according to invention, in which 10 refers to the basic material of the screen, e.g. acrylic. On the reverse side, i.e. the side facing the light sources, the screen element 10a is provided with rectilinear, parallel convex lenses 35 extending at right angles to the lenses 11 of the front side element, and the focal point of which is approximately congruent to the surface 36 of the convex front lenses of the screen.

As shown in FIG. 3, the lense 18 serves to deflect the light horizontally. It will be seen that the ray of light emitted from the green light source "G" is deflected by the Fresnel lens 15 and the convex lens 18 in such a manner that is passes the lens 19 at the point in which the optical axis of the lens 19 strikes the surface of the lens 19. It also is shown in FIG. 3 that rays of light from the blue "B" and the red "R" light sources converge at an angle α before they strike the Fresnel lens 15 and the lense 18. The parallelling of the three rays of light is achieved in the so-called "correction lens" 19 as shown in FIG. 3. Furthermore, as shown in FIG. 2 the middle element 10a on its front side the lens element 36 is provided with projections 20 for application of black paint or a light impenetrable medium to increase the contrast, as it reduces internal relections. It is not a condition to the present invention that the front side of the screen 10a is provided with projections 20 or that black paint is applied to the front side of the screen. In order to reduce possible interference problems between the individual lenses the die or mold may be chemically frosted, or the acrylic may be coated.

In FIG. 2 it is shown that the reverse side, i.e. the side facing the light sources, of the foremost screen element 10 is provided wth rectilinear, horizontal, parallel, convex lenses 11, the focal point of which is congruent to the front plane of the screen, which consists of rectilinear projections 12, on the tops 13 of which the light can emit, and where between the tops of the projections grooves 14 are provided, which are covered with light impenetrable material, e.g. black paint, to increase the contrast. In FIG. 2 the rays of light "A" are parallelled and strike the screen foremost element 10 normal to its surface. On the reverse side of the foremost element is provided with rectilinear lenses 11, which—if for the projection set in question two or three projectors are used—are parallel to the center line, which connects the projectors to each other. In the case of rear-projection television the three projectors 1, 2 and 3 shown in FIG. 1 are usually situated with their center lines at a horizontal plane. If the screen element 10 in FIG. 2 is turned 90° so that the lenses 11 and tops 13 of projections 12 form an angle of 90° relative to the center line of the projectors, the rays of light from the projectors 1 and 3 will be deflected in such a manner that they strike the inside of the V-shaped groove and are absorbed by the black colour. If the lenses 11 and projection tops 13 of the foremost screen element 10 are placed parallel to the center line connecting the projectors, i.e. at horizontal planes parallel thereto, rays of light from the projectors 1 and 3 will also be transmitted through the projection top 13, as these contain no diffusion limitations at a horizontal level. For diffusion of the light horizontally and vertically the tops 13 of the projections 12 are provided with refractive particles.

In FIG. 8 is shown a part of the path of rays through the screen concerned. It will be seen that a parallel pencil of rays strikes the lens 35. The rays of light pass the middle screen element 10a, and thereafter the rays of light are concentrated at the focal point 33 of the lens 11, which focal point is congruent to the tops 13 of the projections 12. The light is diffused in the tops of the projections 12 by means of refractive powder in or at the tops of the projections cams.

It is not decisive of the invention, whether the lens top 13 is plane or has a convex or concave form, or whether the refractive medium is placed inside the top or on the surface 13.

FIG. 9 shows a section through the present invention to illustrate how rays of light from the room are absorbed by the black colour.

EXAMPLE 1

By means of a mold profiled as shown in FIG. 10 was cast a 3 mm thick plate of PMMA as a foremost screen element with 120 g $SiO_2$ per $m^2$ and with a grain size of 15 to 40μ. The radius of curvature for the lens 11 was 1.0 mm, the angle $\beta=24°$. The depth D of the groove between the lenses 12 was 1.65 mm. The width B of the projection top 13 was 0.3 mm.

After the mold had been filled, it was placed horizontally with the projections 12 turned downwards. Thereby the refractive powder was sedimented in such a manner that it settled in a well-defined layer at the surface of the projection top 13 with a thickness of less than 100μ. When the screen was removed from the mold, polyvinyl alcohol (PVA) was applied to the projection tops 13. Thereafter, black paint was applied to the sides of the projections 12. After an appropriate drying time the PVA film was removed from the tops 13 of the projections 12.

A screen with specifications according to FIG. 11 was cast for the middle screen element. The lenses 35 and 36 may be parabolic.

Thereafter the screen showed the following parameters:

| Peak gain: | 4.0 |
|---|---|
| ½ horizontal peak gain: | 38° |
| ½ vertical peak gain: | 10° |

Peak gain refers to the light passing directly measured as normal to the surface relative to a known reference.

Contrast conditions when the television is switched off:

| Screen according to Example 1. | | Known black-striped screen according to FIG. 3 | |
|---|---|---|---|
| Screen | White ref. | Screen | White ref. |
| 1.2 | 59 | 9.4 | 60 |

The screen showed an extremely high contrast and good efficiency so that the picture was made visible over a wide visual angle, horizontally as well as vertically at a visual field +90°.

EXAMPLE 2

In this example a PMMA plate was cast as described in example 1, but with some different dimensions. The division distance was 1.2 mm. The radius R for the lens 11 was 1.0 mm. The projection 12 height D (being the same as the depth of the groove between the cams) was =1.6 mm. The angle $\beta=20°$. The width of the top 13 of the projections 12 was 0.6 mm.

After casting, a film of PVA was applied to the tops 13 of the lens 12. Otherwise the test proceeded in accordance with example 1.

The screen showed the following parameters:

| Peak gain: | 4.2 |
|---|---|
| ½ horizontal peak gain: | 40° |

-continued

| ½ vertical peak gain: | 9° |
|---|---|

Contrast conditions when the television was switched off:

| Screen according to example 1 | | Known black-striped screen according to FIG. 3 | |
|---|---|---|---|
| Screen | White ref. | Screen | White ref. |
| 1.5 | 61 | 9.6 | 61 |

The screen showed an extremely high contrast and good efficiency so that the picture was made visible over a wide visual angle, horizontally as well as vertically, at a visual field of ±90°.

CONCLUSION

It will be seen that there is only a little difference between the two screens as far as the contrast is concerned in spite of the fact that the width B in example 2 is double the width in example 1. The reason for this is that the groove D between the projections 12 is approximately the same in both examples.

EXAMPLE 3

In this example a screen was produced with the design and measures shown in FIG. 10. The screen was extruded from clear PMMA without diffusion powder. Hereinafter a film of PVA was applied to the tops 13 of the screen. The sides of the lens 12 were sprayed with black paint. A mixture of lacquer with a diffusion medium was coated on the entire surface.

The screen showed the same parameters as in example 1.

EXAMPLE 4

This example was carried out as example 1, with the modification, however, that black paint was applied to the tops 21 of projections 20 of the middle screen element and covered 40 percent of the screen area. The screen showed the following parameters:

| Peak gain: | 4.0 |
|---|---|
| ½ horizontal peak gain: | 38° |
| ½ vertical peak gain: | 10° |

Contrast conditions when the television was switched off:

| Screen according to example 4 | | Known black-striped screen according to FIG. 3 | |
|---|---|---|---|
| Screen | White ref. | Screen | White ref. |
| 0.8 | 63 | 9.6 | 61 |

We claim:

1. A transparent rear-projection screen comprising a rearmost screen element in the form of a lens system for parallelling of light coming from behind, and a middle screen element with vertical, rectilinear lenses on a reverse side of the element, and a foremost screen element with rectilinear, parallel, convex lenses with horizontal axes on a reverse side of the foremost screen element and with rectilinear and mainly horizontal projections comprising projections tops of a predetermined width, on a front side of the foremost screen element, with grooves between the projections which are covered or filled with a light impenetrable material, whereby the focal length of the convex lenses on the reverse side of the foremost element corresponds to the thickness of the foremost element.

2. A screen according to claim 1, wherein on the front side of the middle screen element are provided horizontal, convex lenses with projections between the convex lenses, said projections comprising a coating of light impenetrable material.

3. A screen according to claim 1, wherein the grooves between the projections on the front side of the foremost screen element are mainly V-shaped with a depth which is twice the width of the tops of the projections, where said depth is greater than one fourth the thickness of the foremost screen element.

4. A screen according to claim 1, wherein the lenses and the projections of the middle screen element are asymmetric.

5. A screen according to claim 1, wherein the focal point of the reverse side lenses of the middle screen element is substantially at the surface of the front side lenses.

6. A screen according to claim 1, wherein the projections on the front side of the middle screen element are asymmetric.

7. A screen according to claim 1, wherein the axis of symmetry of the front side projections of the foremost screen element is non-parallel with the optical axes of the reverse side lenses.

8. A screen according to claim 1, wherein the V-shaped grooves on the front side of the foremost screen element have sides that form a predetermined angle to the normal of the screen.

9. A screen according to claim 1, wherein the surface of the tops of the projections on the front side of the foremost screen element is non-parallel to the plane of the screen.

10. A screen according to claim 2, wherein the surface of the tops of the projections may be shiny, frosted or semi-frosted.

11. A screen according to claim 10, wherein the projections of the foremost screen element have a width B=0.2 mm, a V-shaped groove depth D=1.6 mm and a top angle $\beta=24°$, that the thickness C of the foremost screen element=3.4 mm, and that the radius of curvature R of the reverse side lenses=1.2 mm with a division distance E=1.2 mm.

12. A screen according to claim 11, wherein the middle screen element has a division distance E=1.2 mm, a radius of curvature R=0.5 mm at the reverse side lenses, a radius of curvature R=0.5 mm at the front side lenses, and a width of the projections B=0.35 mm at the front side of the middle element, wherein said middle element has a thickness C=1.45 mm.

13. A screen according to claim 2, wherein one or both sides of the middle screen element is/are slightly frosted.

14. A screen according to claim 2, wherein the optical axes of the front side and the reverse side lenses of the middle screen element are congruent.

15. A screen according to claim 2, wherein the projections between the lenses on the front side of the middle screen element are asymmetric.

16. A screen according to claim 2, wherein the projections between the lenses of the front side of the middle screen element comprise grooves that are mainly non-parallel to the surface of the screen.

17. A screen according to claim 1, wherein the projections of the foremost screen element comprise visually gifted diffusing powder under the top surface of the projections lens.

18. A screen according to claim 1, wherein a diffusion, visually enhancing medium is coated on the top surface of the projections of the foremost screen element.

19. A screen according to claim 1, wherein the tops of the projections are lenticular.

20. A screen according to claim 2, wherein the front side of the middle screen element is substantially plane.

* * * * *